(12) United States Patent
Liu (10) Patent No.: US 10,375,653 B2
(45) Date of Patent: Aug. 6, 2019

(54) REDUCING POWER CONSUMPTION VIA ADAPTING BROADCAST POWER FOR WIRELESS COMMUNICATIONS

(71) Applicant: Beijing Zhigu Rui Tuo Tech Co., Ltd, Beijing (CN)

(72) Inventor: Jia Liu, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 145 days.

(21) Appl. No.: 15/100,295

(22) PCT Filed: Nov. 6, 2014

(86) PCT No.: PCT/CN2014/090437
§ 371 (c)(1),
(2) Date: May 27, 2016

(87) PCT Pub. No.: WO2015/078278
PCT Pub. Date: Jun. 4, 2015

(65) Prior Publication Data
US 2017/0006557 A1     Jan. 5, 2017

(30) Foreign Application Priority Data

Nov. 30, 2013   (CN) .......................... 2013 1 0632430

(51) Int. Cl.
*H04W 76/00*     (2018.01)
*H04W 52/32*     (2009.01)
(Continued)

(52) U.S. Cl.
CPC ..... *H04W 52/322* (2013.01); *H04L 29/06326* (2013.01); *H04W 24/08* (2013.01);
(Continued)

(58) Field of Classification Search
CPC ............... H04L 9/003; H04L 29/08576; H04L 29/06326; H04W 28/0221; H04W 52/221;
(Continued)

(56) References Cited

U.S. PATENT DOCUMENTS 5,450,616 A * 9/1995 Rom ..................... H04W 52/50
                                                            455/522
9,961,584 B2    5/2018 Alisawi
(Continued)

FOREIGN PATENT DOCUMENTS

CN          101154970        4/2008
CN          101965041        2/2011
(Continued)

OTHER PUBLICATIONS

Bluetooth SIG. "Bluetooth Core Specification Version 4.0", Jun. 30, 2010, published online at [https://www.bluetooth.org/docman/handlers/downloaddoc.ashx?doc_id=229737], retrieved on May 27, 2016, 2302 pages.

(Continued)

*Primary Examiner* — Salvador E Rivas
(74) *Attorney, Agent, or Firm* — Amin, Turocy & Watson, LLP (57) ABSTRACT

The present application provides a broadcasting method and device for wireless communications, and relates to the field of communications. The broadcasting method includes: a broadcasting interception step of sending a broadcasting message with a current power and performing interception; a power decrease step of, when a request is intercepted, judging whether a sender of the request is identical with a sender of at least one historical request, and if yes, recording the current power as a historical power, and decreasing the current power; and a power determination step of judging whether a current broadcasting event ends, if yes, determin- (Continued)

ing the historical power as a working reference power; otherwise, returning to the broadcasting interception step. The broadcasting method and device are conductive to reducing power consumption of communications.

20 Claims, 4 Drawing Sheets (51) Int. Cl.
| | |
|---|---|
| H04L 29/06 | (2006.01) |
| H04W 40/10 | (2009.01) |
| H04W 28/02 | (2009.01) |
| H04W 52/22 | (2009.01) |
| H04W 24/08 | (2009.01) |
| H04L 29/08 | (2006.01) |
| H04W 80/10 | (2009.01) |
| H04B 17/26 | (2015.01) |
| H04W 40/02 | (2009.01) |
| H04L 9/00 | (2006.01) |

(52) U.S. Cl.
CPC ....... *H04W 28/0221* (2013.01); *H04W 40/10* (2013.01); *H04W 52/228* (2013.01); *H04W 76/00* (2013.01); *H04B 17/26* (2015.01); *H04L 9/003* (2013.01); *H04L 29/08576* (2013.01); *H04W 40/02* (2013.01); *H04W 80/10* (2013.01)

(58) Field of Classification Search
CPC ............. H04W 52/226; H04W 52/228; H04W 52/246; H04W 52/00; H04W 52/34; H04W 40/02; H04W 40/10; H04W 76/00; H04W 80/10; H04B 17/26
See application file for complete search history.

(56) References Cited

U.S. PATENT DOCUMENTS

| | | | | |
|---|---|---|---|---|
| 2002/0022495 | A1* | 2/2002 | Choi | ................... H04W 52/265 455/522 |
| 2003/0125019 | A1* | 7/2003 | Bajikar | ............. H04W 72/1215 455/420 |
| 2006/0168504 | A1 | 7/2006 | Meyer et al. | |
| 2008/0274696 | A1* | 11/2008 | Bakshi | ................ H04M 1/6066 455/41.2 |
| 2010/0008277 | A1* | 1/2010 | Kopikare | .......... H04W 52/0274 370/311 |
| 2013/0094491 | A1* | 4/2013 | Sun | ..................... H04W 52/383 370/345 |
| 2014/0120934 | A1 | 5/2014 | Kishiyama | |
| 2014/0169599 | A1 | 6/2014 | Solum et al. | |
| 2014/0323048 | A1* | 10/2014 | Kang | ..................... H04W 4/80 455/41.2 |
| 2014/0357192 | A1 | 12/2014 | Azogui et al. | |
| 2017/0006557 | A1* | 1/2017 | Liu | ....................... H04W 24/08 |

FOREIGN PATENT DOCUMENTS

| | | |
|---|---|---|
| CN | 103179655 A | 6/2013 |
| CN | 103686610 A | 3/2014 |
| CN | 103702391 A | 4/2014 |
| EP | 1443720 | 8/2004 |
| EP | 1972174 | 9/2008 |
| WO | 2013108114 | 7/2013 |

OTHER PUBLICATIONS

International Search report for PCT Patent Application No. PCT/CN2014/090437, dated Feb. 11, 2015, 2 pages.
International Search report for PCT Patent Application No. PCT/CN2014/090436, dated Feb. 9, 2015, 2 pages.
Notice of Allowance dated May 1, 2017 for U.S. Appl. No. 15/100,294, 40 pages.
Office Action dated Jul. 2, 2018 for U.S. Appl. No. 15/665,270, 33 pages.
Office Action dated Dec. 27, 2018 for U.S. Appl. No. 15/665,270, 37 pages.
Non-Final Office Action received for U.S. Appl. No. 15/665,270 dated Apr. 11, 2019, 43 pages.

* cited by examiner

REDUCING POWER CONSUMPTION VIA ADAPTING BROADCAST POWER FOR WIRELESS COMMUNICATIONS

RELATED APPLICATION

The present application is a U.S. National Stage filing under 35 U.S.C. § 371 of international patent cooperation treaty (PCT) application No. PCT/CN2014/090437, filed Nov. 6, 2014, and entitled "BROADCASTING FOR WIRELESS COMMUNICATIONS", which claims the benefit of priority to Chinese Patent Application No. 201310632430.0, filed on Nov. 30, 2013, which applications are hereby incorporated into the present application by reference herein in their respective entireties.

TECHNICAL FIELD

The present application relates to the field of communications technologies, and in particular, to broadcasting for wireless communications.

RELATED ART

In a wireless communications network, a common application scenario is as follows: a first wireless device scans a larger number of other wireless devices and discovers a second wireless device, the first wireless device establishes and maintains a data connection with the second wireless device, and when there is data to be transmitted, the data transmission is performed. For example, a smart phone of a user can discover a smart watch of the user through Bluetooth scanning, and then establishes and maintains a communication connection, and when the smart phone receives a short message, the short message can be sent to the watch for display.

By taking Bluetooth Low Energy (BLE) as an example, a wireless device discovery process involves different device roles and operation procedures, including:

1) A slave device plays a role of an advertiser for executing a broadcasting process. In this period, broadcasting events continuously enter the salve device. A certain interval $T_a$ exists between start times of adjacent broadcasting events, and is formed by a broadcasting interval (advInterval) with a fixed length and a broadcasting delay (advDelay) with a randomly generated length. In the broadcasting events, the advertiser respectively sends a packet data unit (PDU), that is, a broadcasting message, on broadcasting channels 37, 38 and 39.

2) A master device plays a role of an initiator/scanner for executing an initiation/scanning process. The initiation/scanning process includes repeated scan intervals (scanInterval), and each interval includes a scan window (scanWindow). In different scan windows, a radio frequency (RF) module of the master device executes interception on the broadcasting channel 37, 38 or 39, so as to receive a broadcasting PDU on the corresponding channel; beyond the scan windows, the master device performs daily scheduling, or closes the RF module. If the initiator/scanner receives the broadcasting PDU, it means that a corresponding advertiser device is discovered successfully. The initiator can directly send a connection request (CONN_REQ) to make an agreement with the advertiser on time points of first sending and receiving, intervals between sending and receiving operations, hopping channels and hopping modes used and other information, so as to establish a connection; and the scanner can send a scan request (SCAN_REQ) to require the advertiser to reply so as to provide more relevant information.

It can be seen that, the discovery process between wireless devices is a process of mutual detection, which may not involve determination of a transmission power, which is not conductive to reducing power consumption of communications between the wireless devices.

SUMMARY

An example, non-limiting object of one or more embodiments of the present invention is to provide a broadcasting method and device for wireless communications, so as to reduce power consumption of communications between wireless devices.

According to a first aspect of one or more embodiments of the present invention, a broadcasting method for wireless communications is provided, where the method includes:

a broadcasting interception step of sending a broadcasting message with a current power and performing interception;

a power decrease step of, when a request is intercepted, judging whether a sender of the request is identical with a sender of at least one historical request, and if yes, recording the current power as a historical power, and decreasing the current power; and a power determination step of judging whether a current broadcasting event ends, if yes, determining the historical power as a working reference power; otherwise, returning to the broadcasting interception step.

According to a second aspect of one or more of the embodiments of the present invention, a broadcasting device for wireless communications is provided, where the broadcasting device includes:

a broadcasting interception module, configured to send a broadcasting message with a current power and perform interception;

a request judging module, configured to, when the broadcasting interception module intercepts a request, judge whether a sender of the request is identical with a sender of at least one historical request;

a power adjusting module, configured to, when the sender of the request is identical with the sender of the historical request, record the current power as a historical power, and decrease the current power; and a power determining module, configured to determine the historical power as a working reference power when a current broadcasting event ends.

According to a broadcasting method and device of one or more of the embodiments of the present application, after requests sent by the same request sender are intercepted at least twice, there is no rush to end a broadcasting event, but broadcasting interception continues for the same request sender after reduction of power; therefore, a finally obtained working reference power can be closer to the lowest power of the broadcasting device while ensuring communications with the same request sender, and actual working power of the broadcasting device can be determined according to the working reference power, which is conducive to reducing power consumption of communications.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Specific implementations of the present application are described in detail hereinafter with reference to the accompanying drawings and embodiments. The following embodiments are intended to describe the present application, but not to limit the scope of the present application.

Those skilled in the art can understand that, in the embodiments of the present application, sequence numbers of the following steps do not mean an order of execution, the order of execution of the steps should be determined according to their functions and internal logic, and should not pose any limitation to implementation of the specific embodiments of the present application.

In many application scenarios, a device may establish a wireless communication connection after completing discovery with a high transmission power, so as to perform data transmission. In order to reduce power consumption of communications, the device may reduce its transmission power to an appropriate value after establishing the wireless communication connection, the appropriate value is generally between a maximum power and a minimum power of the device, and it is appropriate that the value can just ensure effective communications. For example, the transmission power of a TI CC2540 single-mode low-power consumption Bluetooth chip is from −23 dBm to 4 dBm, the corresponding current strength is from 21.1 mA to 31.6 mA, and a difference between power consumption of the lowest power and the minimum power is close to 50%. Through such power adjustment, the device can reduce the power consumption after establishment of the connection, but before the power adjustment, the problem of over-high power consumption still exists. If a power value that can just allow effective communications of the device is determined before establishment of the communication connection, for example, in the device discovery process, to serve as a power reference value of the communications of the device after establishment of the connection, the power consumption of communications can be further reduced.

Figure 1:
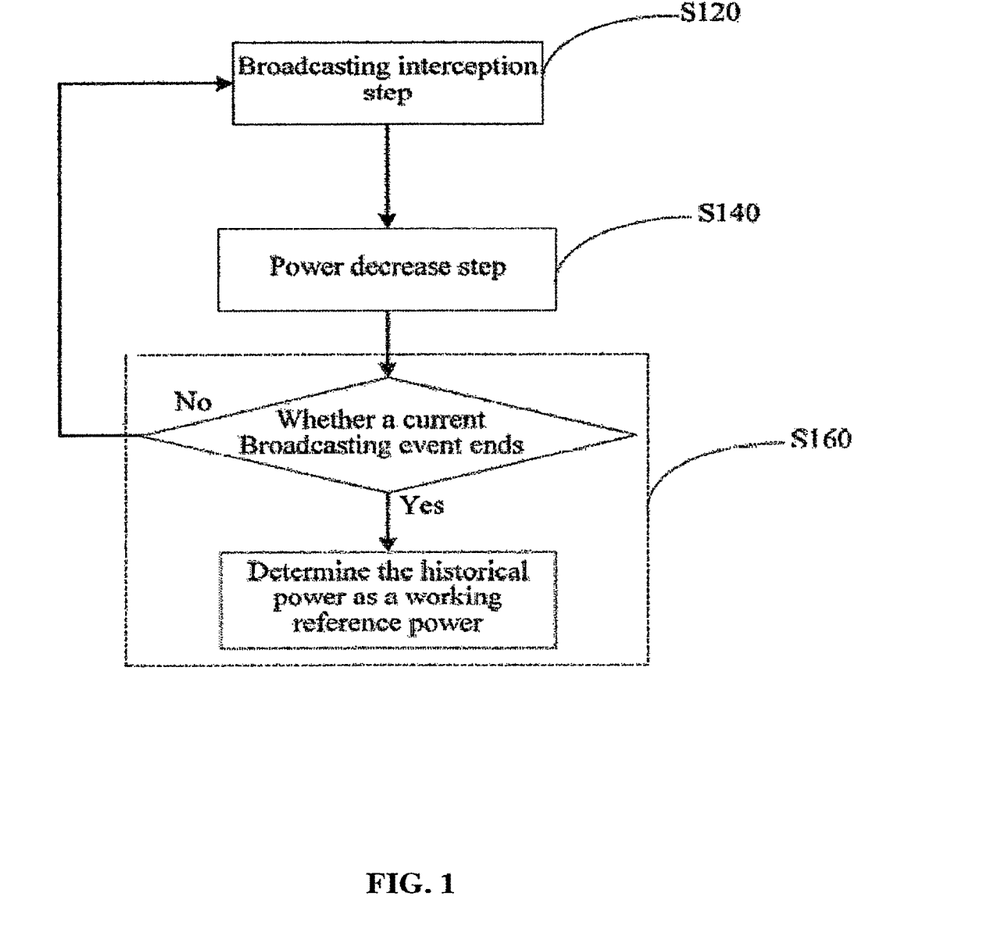
FIG. 1 is a flowchart of a broadcasting method according to an embodiment of the present application.

Therefore, one or more of the embodiments of the present application provide a broadcasting method for wireless communications, as shown in FIG. 1, where a method includes:

S120: a broadcasting interception step of sending a broadcasting message with a current power and performing interception;

S140: a power decrease step of, when a request is intercepted, judging whether a sender of the request is identical with a sender of at least one historical request, and if yes, recording the current power as a historical power, and decreasing the current power; and S160: a power determination step of judging whether a current broadcasting event ends, if yes, determining the historical power as a working reference power; otherwise, returning to the broadcasting interception step.

According to a broadcasting method of one or more of the embodiments of the present application, after requests sent by the same request sender are intercepted at least twice, there is no rush to end a broadcasting event, but broadcasting interception continues for the same request sender after reduction of power; therefore, a finally obtained working reference power can be closer to the lowest power of the broadcasting device while ensuring communications with the same request sender, and actual working power of the broadcasting device can be determined according to the working reference power, which is conducive to reducing power consumption of communications.

Specifically, in the step S140, the historical request refers to a request intercepted before the currently intercepted request in a current broadcasting event. The request may be a connection request or a scan request. When a request is intercepted for the first time, as no historical request exists before, it should be considered that a sender of the request is different from a sender of the historical request.

In addition, in order to be easy to compare the sender of the currently intercepted request with the sender of the historical request, the power decrease step S140 further includes: recording the sender of the request when the request is intercepted.

For the decreasing the current power, the current power can be decreased according to a power adjustment algorithm, and the power adjustment algorithm may be at least one of, for example, a dynamic programming algorithm, a prediction algorithm and a search algorithm. For example, a simple search algorithm is subtracting a fixed step value each time from the current power.

In the step S160, each broadcasting event may generally include a predetermined number of broadcasting message sending processes, by taking low-power consumption Bluetooth as an example, each broadcasting event thereof generally includes three broadcasting message sending processes, and thus the method can adjust the current power at most twice, and a working reference power obtained after adjustment can be closer to the lowest power of the sender of the broadcasting message while ensuring communications. Those skilled in the art should understand that, if a broadcasting message can be sent more times in each broadcasting event, an obtained working reference power can be much closer to the lowest power of the sender of the broadcasting message, so as to reduce power consumption of communications more easily. Meanwhile, those skilled in the art should understand that, in order to cooperate with the sender of the broadcasting message to implement the method, it is inappropriate that the sender of the request directly establishes a connection or acquires more connection-related information each time the broadcasting message is received, but should correspondingly reply to a corresponding request (connection request or scan request) multiple times according to the broadcasting messages sent by the sender of the broadcasting message.

In an implementation of a method of the present application, in order that the sender of the request can decide, according to the broadcasting message received, a power at which the request is sent, the broadcasting message optionally includes information of the current power. According to the information of the current power and signal strength when the broadcasting message is received, the sender of the request can obtain corresponding path loss through calculation. Based on the path loss, the sender of the request can determine a sending power capable of ensuring that the request is just accurately received, and then the sender sends the request with the sending power, which can further reduce power consumption of communications.

Figure 2:
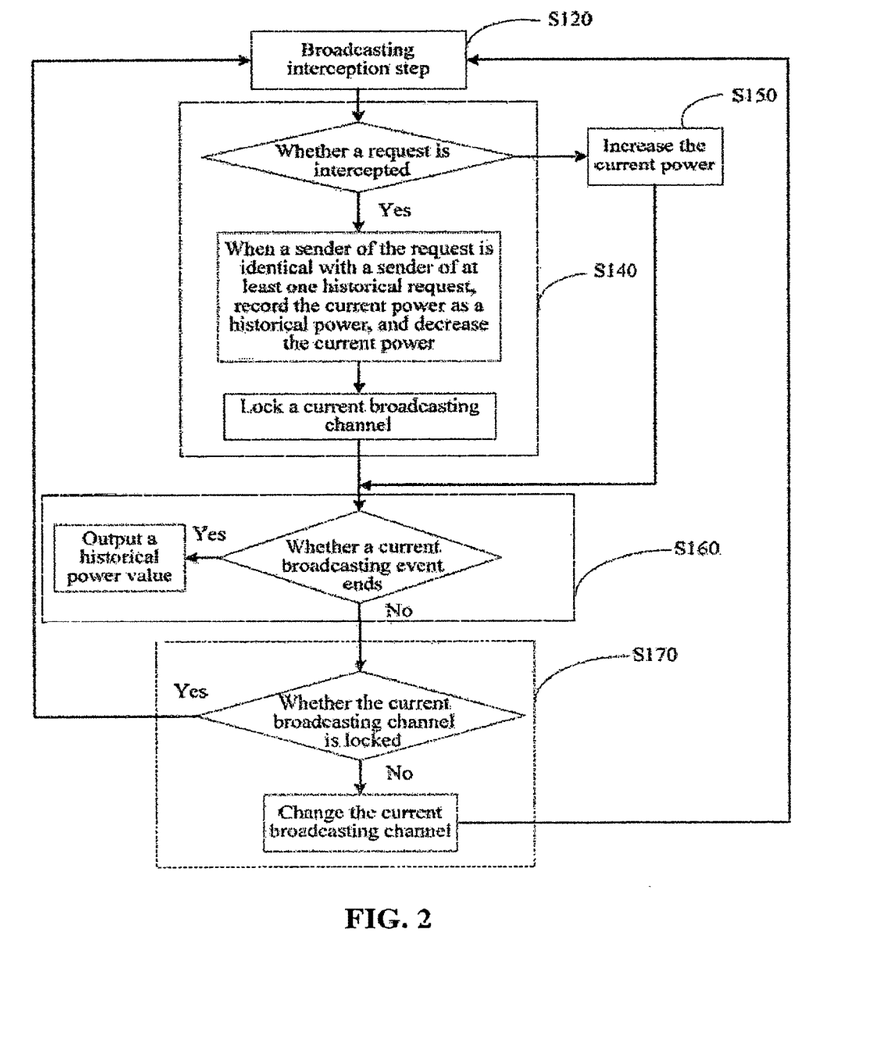
FIG. 2 is a flowchart of a broadcasting method according to another embodiment of the present application.

Referring to FIG. 2, in an example embodiment of the present application, if the sender of the request and the sender of the historical request are the same, the step S140 further includes: locking a current broadcasting channel.

Correspondingly, when a judgment result of the step S160 is that the current broadcasting event does not end, before returning to the step S120, the method further includes:

S170: a channel change step of judging whether a current broadcasting channel is locked, if yes, returning to the broadcasting interception step; otherwise, changing the current broadcasting channel, and returning to the broadcasting interception step.

If the current broadcasting channel is locked, it indicates that a request sent by a sender identical with the sender of the historical request (that is, the same request sender) is intercepted on the current broadcasting channel, and by locking the current broadcasting channel and broadcasting a message and perform interception on the locked current broadcasting channel, the probability that a request sent by the same request sender is intercepted once more in next interception can be improved.

If the channel is not locked, it indicates that the request sent by the same request sender is not intercepted on the current channel, and in this case, the current broadcasting channel should be changed according to a default interception process and then broadcasting interception is continued.

Referring to FIG. 2, in another embodiment of the present application, the method may further include:

S150: a power increase step of increasing the current power when no request is intercepted.

Generally, the method may be started with a high current power, and then the current power is gradually reduced according to the step S140; when no request is intercepted, it may be caused by that the current power is too low, for example, on the assumption that a broadcasting device sends a broadcasting message with the lowest power 3 dB, and the broadcasting message just can be intercepted by another scanning device, the broadcasting device can receive a request when sending the broadcasting message with 8 dB for the first time, and still can receive the request when sending the broadcasting message with a power decreased to 4 dB for the second time, but when sending the broadcasting message with a power decreased to 2 dB for the third time, the broadcasting device cannot receive the request because the power is too low. In this case, the broadcasting device can increase the probability of intercepting the request by properly increasing the current power.

In addition, if, before the last power is decreased, requests sent by the same request sender are intercepted at least twice (that is, the historical power is recorded), and no request is intercepted after the last decrease, it indicates that the request can be intercepted at a power before the last decrease, that is, the historical power. Therefore, in order to obtain a working reference power close to a minimum power of the sender of the broadcasting message, the current power increased is less than or equal to the historical power. Still using the above assumption, the broadcasting device, when increasing the current power, can attempt to increase the current power to 2.5 dB or 3 dB, but there is no need to increase the current power to 4.5 dB, because it has been proved that the request can be received at 4 dB.

In addition, one or more of the embodiments of the present application also provide a computer readable medium, comprising computer readable instructions which perform the following operations when being executed: executing the operations of steps S120, S140 and S160 of the method in the implementation shown in FIG. 1.

To sum up, according to a broadcasting method of an embodiment of the present application, when requests sent by the same request sender are intercepted at least twice, a current power may be decreased and a current broadcasting channel is locked, so as to continue intercepting a request sent by the same request sender on the current broadcasting channel, and then the current power can be decreased as much as possible for the same request sender, when the current power is adjusted to be too low, the current power is reversely adjusted through a power increase step, a working reference power finally obtained is closer to the lowest power of the sender of the broadcasting message while ensuring communications with the same request sender, and an actual working power of the sender of the broadcasting message can be determined according to the working reference power, which is conducive to reducing power consumption of wireless communications such as Bluetooth and Zigbee.

Figure 3:
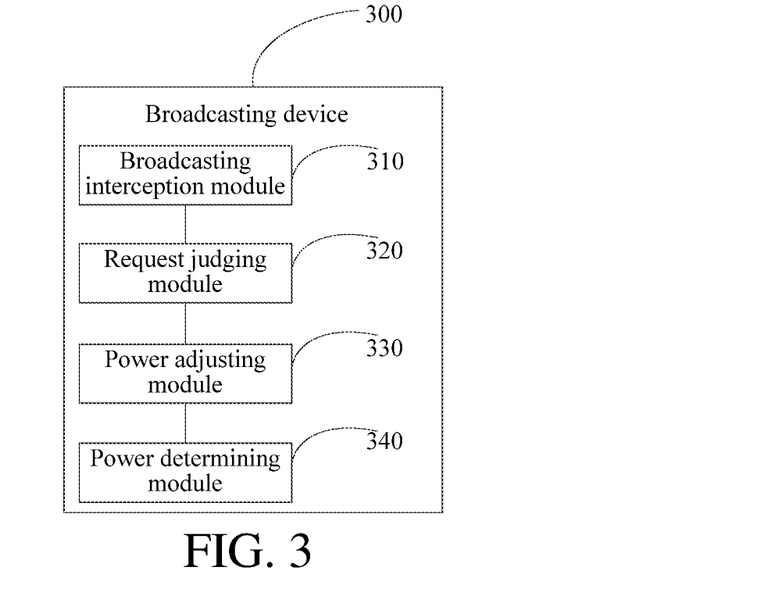
FIG. 3 is a schematic structural diagram of modules of a broadcasting device according to one embodiment of the present application.

FIG. 3 is a schematic structural diagram of modules of an broadcasting device according to an embodiment of the present application, where the broadcasting device 300 may be a Bluetooth device, a Zigbee device or the like, for example, the broadcasting device 300 may be a device such as a Bluetooth headset, a smart phone or smart glasses.

As shown in FIG. 3, the broadcasting device 300 includes: a broadcasting interception module 310, a request judging module 320, a power adjusting module 330 and a power determining module 340.

The broadcasting interception module 310 is configured to send a broadcasting message with a current power and perform interception;

the request judging module 320 is configured to, when the broadcasting interception module intercepts a request, judge whether a sender of the request is identical with a sender of at least one historical request;

the power adjusting module 330 is configured to, when the sender of the request is identical with the sender of the historical request, record the current power as a historical power, and decrease the current power; and the power determining module 340 is configured to determine the historical power as a working reference power when a current broadcasting event ends.

Specifically, the historical request refers to a request intercepted before a currently intercepted request in a current broadcasting event. The request may be a connection request or a scan request. When a request is intercepted for the first time, as no historical request exists before, it should be considered that a sender of the request is different from a sender of the historical request.

The power adjusting module 330 can decrease the current power according to a power adjustment algorithm, and the power adjustment algorithm may be at least one of, for example, a dynamic programming algorithm, a prediction algorithm and a search algorithm. For example, a simple search algorithm is subtracting a fixed step value each time from the current power.

Each broadcasting event may generally include a predetermined number of broadcasting message sending processes, by taking low-power consumption Bluetooth as an example, each broadcasting event thereof generally includes three broadcasting message sending processes, and thus the broadcasting device can adjust the current power at most twice in each broadcasting event, and a working reference power obtained after adjustment can be closer to the lowest power of the sender of the broadcasting message while ensuring communications. Those skilled in the art should understand that, if an broadcasting message can be sent more times in each broadcasting event, an obtained working reference power can be closer to the lowest power of the sender of the broadcasting message, so as to reduce power consumption of communications more easily. Meanwhile, those skilled in the art should understand that, in order to cooperate with the broadcasting device, it is inappropriate that the request sender (that is, a scanning device) directly establishes a connection or acquires more connection-related information each time the broadcasting message is received, but should correspondingly reply to a corresponding request (connection request or scan request) multiple times according to the broadcasting message sent by the broadcasting device.

In an implementation of the method of the present application, in order that the sender of the request can decide a power at which the request is sent according to the broadcasting message received, the broadcasting message optionally includes information of the current power. According to the information of the current power and signal strength when the broadcasting message is received, the sender of the request can obtain corresponding path loss through calculation. Based on the path loss, the sender of the request can determine a sending power capable of ensuring that the request is just accurately received, and then the sender sends the request with the sending power, which can further reduce power consumption of communications.

Figure 4:
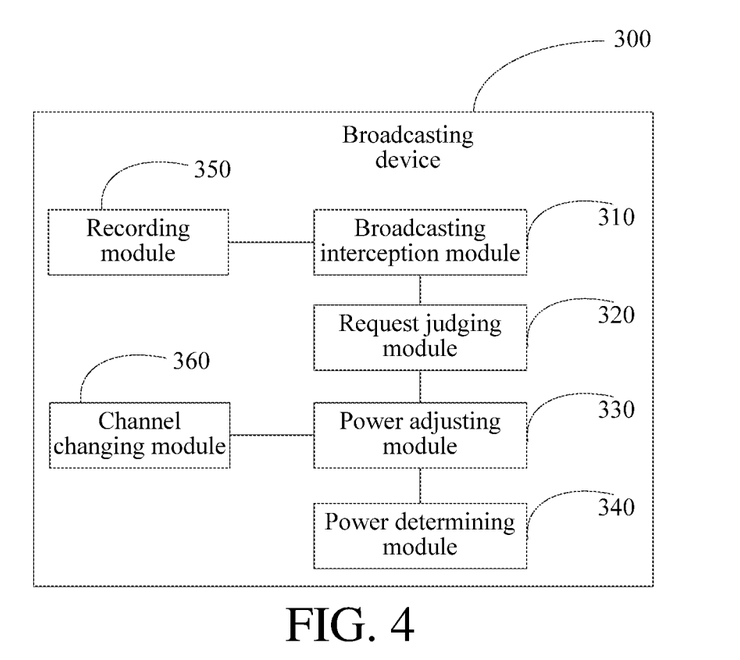
FIG. 4 is a schematic structural diagram of modules of a broadcasting device according to another embodiment of the present application.

Referring to FIG. 4, in an example embodiment of the present application, the broadcasting device 300 may further includes: a recording module 350 and a channel changing module 360.

The recording module 350 is configured to record the sender of the request when the broadcasting interception module intercepts the request, so that the request judging module 320 compares the sender of the currently intercepted request with the sender of the historical request.

In the implementation, the power adjusting module 330 is further configured to lock a current broadcasting channel when the sender of the request is identical with the sender of the historical request.

Correspondingly, the channel changing module 360 is configured to judge whether a current broadcasting channel is locked each time the broadcasting message is sent, and if no, change the current broadcasting channel.

If the current broadcasting channel is locked, it indicates that a request sent by a sender identical with the sender of the historical request (that is, the same request sender) is intercepted on the current broadcasting channel, and by locking the current broadcasting channel and broadcasting a message and perform interception on the locked current broadcasting channel, the probability that a request sent by the same request sender is intercepted once more in next interception can be improved.

If the channel is not locked, it indicates that the request sent by the same request sender is not intercepted on the current channel, and in this case, the current broadcasting channel should be changed according to a default interception process and then broadcasting interception is continued.

In addition, the power adjusting module 330 is further configured to increase the current power when the broadcasting interception module intercepts no request.

Generally, the broadcasting device may start broadcasting interception with a high current power, and then gradually reduces the current power; when no request is intercepted, it may be caused by that the current power is too low, for example, on the assumption that a broadcasting device sends a broadcasting message with the lowest power 3 dB, and the broadcasting message just can be intercepted by another scanning device, the broadcasting device can receive a request when sending the broadcasting message with 8 dB for the first time, and still can receive the request when sending the broadcasting message with a power decreased to 4 dB for the second time, but when sending the broadcasting message with a power decreased to 2 dB for the third time, the broadcasting device cannot receive the request because the power is too low. In this case, the broadcasting device can increase the probability of intercepting the request by properly increasing the current power.

To sum up, according to a broadcasting device of an embodiment of the present application, when requests sent by the same request sender are intercepted at least twice, a current power may be decreased and a current broadcasting channel is locked, so as to continue intercepting a request sent by the same request sender on the current broadcasting channel, and then the current power can be decreased as much as possible for the same request sender, when the current power is adjusted to be too low, the current power is reversely adjusted through a power increase step, a working reference power finally obtained is closer to the lowest power of the sender of the broadcasting message while ensuring communications with the same request sender, and an actual working power of the sender of the broadcasting message can be determined according to the working reference power, which is conducive to reducing power consumption of communications.

Figure 5:
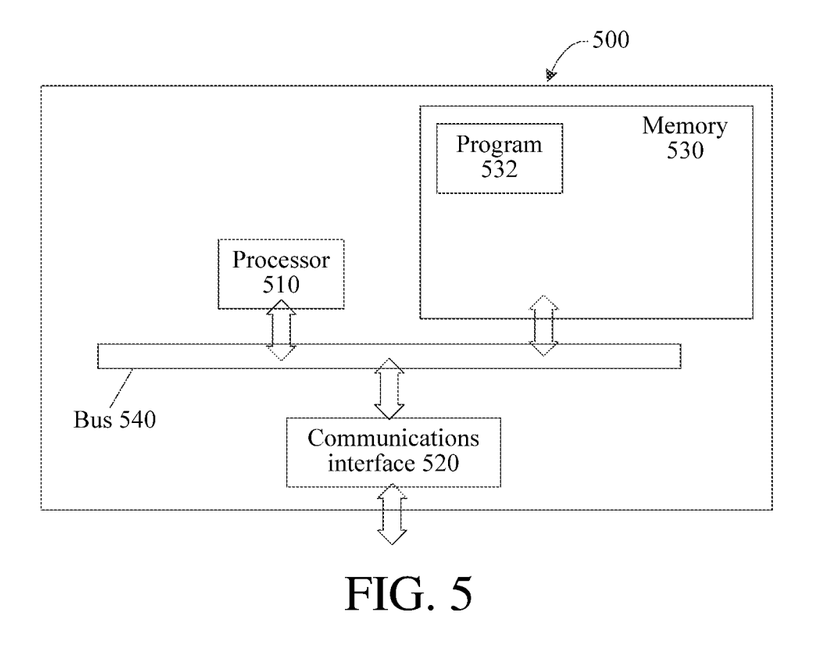
FIG. 5 is a schematic diagram of a hardware structure of a broadcasting device according to an embodiment of the present application.

A hardware structure of the broadcasting device in this embodiment is shown in FIG. 5. The specific embodiment of the present application does not limit specific implementation of the broadcasting device; referring to FIG. 5, the broadcasting device 500 may include:

a processor 510, a communications interface 520, a memory 530, and a communications bus 540.

The processor 510, the communications interface 520, and the memory 530 complete mutual communications by means of the communications bus 540.

The communications interface 520 is configured to communicate with another network element such as a scanning device.

The processor 510 is configured to execute a program 532, and specifically, can execute relevant steps in the process embodiment shown in FIG. 1.

Specifically, the program 532 may include a program code, where the program code includes a computer operation instruction.

The processor 510 may be a central processing unit (CPU), or an application specific integrated circuit (ASIC), or be configured to be one or more integrated circuits which implement one or more of the embodiments of the present application.

The memory 530 is configured to store the program 532. The memory 530 may include a high-speed RAM memory, and may also include a non-volatile memory, for example, at least one magnetic disk memory. The program 532 may specifically execute the following steps:

a broadcasting interception step of sending a broadcasting message with a current power and performing interception;

a power decrease step of, when a request is intercepted, judging whether a sender of the request is identical with a sender of at least one historical request, and if yes, recording the current power as a historical power, and decreasing the current power; and a power determination step of judging whether a current broadcasting event ends, if yes, determining the historical power as a working reference power; otherwise, returning to the broadcasting interception step.

Reference can be made to the corresponding steps or modules in one or more of the embodiments above for specific implementation of each step in the program 532, which is not repeated herein. Those skilled in the art can clearly understand that, for ease of description, reference can be made to the corresponding description in the preceding process embodiments for the specific working procedures of the devices and modules described above, which will not be repeated herein.

It can be appreciated by those of ordinary skill in the art that each exemplary unit and method step described with reference to one or more of the embodiments disclosed herein can be implemented by electronic hardware or a combination of computer software and electronic hardware. Whether these functions are executed in a hardware mode or a software mode depends on the particular applications and design constraint conditions of the technical solution. Persons skilled in the art can implement the functions described for each particular application by using different methods, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and includes several instructions for enabling a computer apparatus (which can be a personal computer, a server, a network device, or the like) to execute all or some steps of the method described in each embodiment of the present application. The storage medium includes various media capable of storing a program code, such as a USB disk, a mobile hard disk, a read-only memory (ROM), a random access memory (RAM), a magnetic disk, or an optical disc.

The above implementations are only used to describe the present application, instead of limiting the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
   sending, by a device comprising a processor, a broadcasting message with a current power, wherein the sending occurs during a device discovery process prior to a communication connection being established, and performing interception;
   when a request is intercepted, determining whether a current sender of the request is identical to a historical sender of at least one historical request, and in response to determining that the current sender of the request is identical to the historical sender of the at least one historical request, recording the current power as a historical power, and decreasing the current power; and
   determining whether a current broadcasting event has ended, and in response to the current broadcasting event being determined to have ended, determining the historical power as a minimum power for the device discovery process, ending the device discovery process, establishing the communication connection with the requesting device, resulting in an established communication connection, and using the minimum power as a transmission power for the established communication connection, and, in response to the current broadcasting event being determined not to have ended, returning to the sending.

2. The method of claim 1, further comprising:
   increasing the current power when no request is intercepted.

3. The method of claim 1, wherein the determining whether the current sender of the request is identical to the historical sender further comprises:
   recording the current sender of the request when the request is intercepted.

4. The method of claim 1, wherein the determining whether the current sender of the request is identical to the historical sender further comprises:
   locking a current broadcasting channel in response to the current sender of the request being determined to be identical with the historical sender of the historical request.

5. The method of claim 1, further comprising:
   before returning to the sending, determining whether a current broadcasting channel is locked, and in response to determining that the current broadcasting channel is locked, returning to the sending, and, in response to determining that the current broadcasting channel is not locked, changing the current broadcasting channel and returning to the sending.

6. The method of claim 1, wherein the request is a connection request or a scan request.

7. The method of claim 1, wherein the sending the broadcasting communications comprises sending the broadcasting communications using Bluetooth communications or Zigbee communications.

8. A device, comprising:
   a memory that stores executable modules; and
   a processor, coupled to the memory, that executes the executable modules to perform operations of the apparatus, the executable modules comprising:
   a broadcasting interception module configured to send, during a device discovery process occurring in advance of establishing a communication connection, a broadcasting message with a current power and configured to perform interception;
   a request judging module configured to, in response to interception of a request by the broadcasting interception module, determine whether a first sender of the request is a same sender as a second sender of a historical request;
   a power adjusting module configured to, in response to the first sender being determined to be the same sender as the second sender of the historical request, record the current power as a historical power, and decrease the current power; and
   a power determining module configured to, in response to a determination that a current broadcasting event has ended, determine the historical power as a minimum power for the device discovery process, end the device discovery process, establish the communication connection with the requesting device, resulting in an established communication connection, and use the historical power as a transmission power for the established communication connection.

9. The device of claim 8, wherein the power adjusting module is further configured to increase the current power in response to the broadcasting interception module not intercepting the request.

10. The device of claim 8, wherein the executable modules further comprise:
a recording module configured to record the first sender of the request in response to the broadcasting interception module intercepting the request.

11. The device of claim 8, wherein the power adjusting module is further configured to lock a current broadcasting channel in response to the first sender of the request being determined to be the same sender as the second sender of the historical request.

12. The device of claim 8, wherein the executable modules further comprise:
a channel changing module configured to determine whether a current broadcasting channel is locked each time the broadcasting message is sent, and in response to the broadcasting channel being determined not to be locked each time the broadcasting message is sent, change the current broadcasting channel.

13. The device of claim 8, wherein the broadcasting device is a Bluetooth device or a Zigbee device.

14. A computer readable storage device, comprising at least one executable instruction, which, in response to execution, causes a broadcasting device for wireless communications comprising a processor to perform operations, comprising:
sending a broadcasting message during a device discovery process occurring before initiating a communication connection, wherein the broadcast message comprises a current power;
when a request is intercepted, determining whether a sender of the request is identical to another sender of at least one historical request, and if the sender is identical to the other sender, recording the current power as a historical power, and decreasing the current power; and
determining whether a current broadcasting event has ended ends, if the current broadcasting event has ended, determining the historical power as a minimum power for the device discovery process, ending the device discovery process, establishing the communication connection with the requesting device, resulting in an established communication connection, and using the minimum power as a transmission power for the established communication connection, and, if the current broadcasting event has not ended, performing another iteration of the sending.

15. The computer readable storage device of claim 14, wherein the determining whether a sender of the request is identical to another sender of at least one historical request comprises storing information related to the sender of the request.

16. The computer readable storage device of claim 14, wherein the operations further comprise:
in response to determining that the current sender of the request is identical to the historical sender, locking a current broadcasting channel of the current broadcasting event.

17. A device for wireless communications, comprising a processor and a memory, the memory storing executable instructions, the processor being connected to the memory through a communication bus, and when the device for wireless communications operates, the processor executes the executable instructions stored in the memory, causing the device to perform operations, comprising:
during a device discovery process before a communication connection is established, sending a broadcasting message with a current power and performing interception;
when a request is intercepted, judging whether a first sender of the request is identical with a second sender of at least one historical request, and if yes, recording the current power as a historical power, and decreasing the current power; and
judging whether a current broadcasting event ends, if yes, determining the historical power as a minimum power for the device discovery process, ending the device discovery process, establishing the communication connection with the requesting device, resulting in an established communication connection, and using the minimum power as a transmission power for the established communication connection, and otherwise, returning to the sending of the broadcasting message.

18. The device for wireless communications of claim 17, wherein the judging whether a sender of the request is identical with a sender of at least one historical request comprises storing information related to the sender of the request.

19. The device for wireless communications of claim 17, wherein the request is a connection request or a scan request.

20. The device for wireless communications of claim 17, wherein the operations further comprise:
in response to judging that the first sender of the request is identical with the second sender of the at least one historical request, locking a current broadcasting channel of the current broadcasting event.

* * * * *